(12) United States Patent
Konnola et al.

(10) Patent No.: US 9,111,479 B2
(45) Date of Patent: Aug. 18, 2015

(54) COLOR OPTIMIZATION FOR VISUAL REPRESENTATION

(71) Applicant: Documill Oy, Espoo (FI)

(72) Inventors: Mika Konnola, Espoo (FI); Rami Hanninen, Espoo (FI); Terho Laakso, Espoo (FI)

(73) Assignee: DOCUMILL OY, Espoo (FI)

( * ) Notice: Subject to any disclaimer, the term of this patent is extended or adjusted under 35 U.S.C. 154(b) by 51 days.

(21) Appl. No.: 13/915,996

(22) Filed: Jun. 12, 2013

(65) Prior Publication Data

US 2014/0368528 A1   Dec. 18, 2014

(51) Int. Cl.
*G09G 5/02* (2006.01)

(52) U.S. Cl.
CPC ........................................ *G09G 5/02* (2013.01)

(58) Field of Classification Search
CPC ............ H04N 1/4072; H04N 1/40062; G06K 9/4652; G06K 15/02; G06K 15/1815; G06K 15/1836; G06K 15/184; G06K 15/1842
See application file for complete search history.

(56) References Cited

U.S. PATENT DOCUMENTS

| | | | | |
|---|---|---|---|---|
| 7,215,814 B2 * | 5/2007 | Suzuki | .......................... | 382/167 |
| 2007/0002348 A1 * | 1/2007 | Hagiwara | .................... | 358/1.13 |
| 2007/0109569 A1 * | 5/2007 | Eschbach et al. | .............. | 358/1.9 |
| 2009/0296157 A1 * | 12/2009 | Misawa et al. | ............... | 358/3.24 |

\* cited by examiner

*Primary Examiner* — Benny Q Tieu
*Assistant Examiner* — Haris Sabah
(74) *Attorney, Agent, or Firm* — Young & Thompson

(57) ABSTRACT

A method for optimizing an amount of colors used in content data is described. At least one content object is received and it is analyzed if any of the received content objects is a predetermined type. At least one color used within the at least one content object of the predetermined type is determined and the received content objects are rendered to a raster canvas so that the at least one color is protected. Information on the at least one color is stored and at least one characteristic of the rendered content is compared to at least one predetermined criteria. In case of mismatch the amount of colors used in the content of the raster canvas is optimized so that the at least one color used in at least one rendered content object of the predetermined type is protected. Finally, the content is compressed and output.

15 Claims, 5 Drawing Sheets

COLOR OPTIMIZATION FOR VISUAL REPRESENTATION

TECHNICAL FIELD

The invention concerns in general the technical field of image processing. Especially the invention concerns optimizing of image content data for visual representation.

BACKGROUND OF THE INVENTION

The digitalization of information has resulted in a development of ways for preparing graphical information for visualization. Generally speaking the visualization of graphical information i.e. images in a two dimensional space is based on two main types of graphical information, the first of which is called vector graphics and the second of which is called raster graphics (also known as bitmap). Images based on the vector graphics are well-suited for showing ordered, exact and constructed items like text in vector graphics, lineart and diagrams. Images based on the raster graphics, in turn, are well-suited for showing disordered, approximate and natural items, like landscapes and physical objects. An additional type of content to be visualized is text wherein predetermined font libraries are used in order to visualize the textual content.

The information to be visualized as a whole, e.g. in a document page, may typically be built up from several content objects. Often the content objects represent several different content types. For example, there can be content objects of text type and content objects of bitmap type to be visualized in the final graphical presentation. The content objects are rendered to an image i.e. raster canvas, which is an uncompressed form of the graphical image comprising the content object data. In order to store and/or deliver the graphical image in a computer memory and/or to a recipient it is advantageous to compress the raster image in the raster canvas to a raster file in a bitmap format.

Prior compressing the raster image in the raster canvas, it is often practical to first optimize the raster image data to be compressed. At least some traditional solutions which seek to optimize the storage size (file size) of the data in a raster canvas are based on an idea that the optimization operations are performed to final pixel data of the raster image, representing all the content belonging to the raster image. Such operations may relate to optimizing the quality of the raster image by e.g. reducing number of colors used or reducing resolution of the raster image. The problem with especially the color reduction is that as the image content data in the raster file may comprise multiple types of content objects, these kinds of optimization operations do not take the characteristics of the different content object types anyhow into an account during the optimization phase. As a result, the content in the page as regards to at least some content objects may get inaccurate as critical details of the content visual representation may get lost, which can negatively impact the viewing experience when the content is visualized. This applies especially to textual content, which needs to be maintained sharp, while color shading based anti-alias effect is often applied around the smoothly curving details. Also, there may be other fine details to be preserved throughout the image processing in order to deliver a desired effect in the final content visualization. In addition to textual content the vector graphics are often vulnerable to optimization based on such color reduction.

SUMMARY OF THE INVENTION

An objective of the invention is to present a method, a system and a computer program code stored in computer readable medium for optimizing content data. Another objective of the invention is that the method, the system and the computer program code stored in computer readable medium provide tools for optimizing an amount of colors used in content data.

The objects of the invention are reached by a method, a system and a computer program code as defined by the respective independent claims.

According to a first aspect, a computer implemented method for optimizing an amount of colors used in content data is provided wherein the method comprises receiving at least one content object; analyzing at least if the at least one received content object is a predetermined type; in response to a determination as an outcome of the analysis that at least one of the received content objects is predetermined type, determining at least one color used within the at least one content object of the predetermined type; rendering the received content objects to a raster canvas wherein the rendering is configured to be performed by protecting the at least one color used in the at least one content object of a predetermined type; storing information on the at least one color used in at least one rendered content object of the predetermined type; comparing at least one characteristic of the rendered content in the raster canvas to at least one predetermined criteria; in response to a mismatch of the characteristic of the rendered content in the raster canvas with the at least one predetermined criteria, optimizing the amount of colors used in the content of the raster canvas, wherein the optimization is performed by protecting the at least one color used in at least one rendered content object of the predetermined type; compressing the content of the optimized content in the raster canvas; and outputting the compressed content of the raster canvas.

The at least one color may comprise a set of colors used in all received content objects of predetermined type. Alternatively, the at least one color may comprise a sub-set of a set of colors used in all received content objects of predetermined type.

The amount of colors in the raster canvas as at least one characteristic of the rendered content may be compared to a color limit set for the raster canvas.

The analysis if the at least one received content object is a predetermined type may further comprise determination of area information on each of content object. A comparison of cumulative area information of a content object of a first type may be performed to at least one of the following: cumulative area information of at least one other content object of a second type, area information of a raster canvas. In response to the comparison control data for color optimization may be defined. The control data may further be utilized in at least one of the following: selecting a file format for compressed content, selecting a color model for a file format, selecting a compression method for the content.

According to a second aspect, a system for optimizing an amount of colors used in content data is provided wherein the system comprises one or more processors, a memory including computer program code and the memory and the computer program code are configured to, with the processor, cause the system at least to perform receive at least one content object; analyze at least if the at least one received content object is a predetermined type; in response to a determination as an outcome of the analysis that at least one of the received content objects is predetermined type, determine at least one color used within the at least one content object of the predetermined type; render the received content objects to a raster canvas wherein the rendering is configured to be performed by protecting the at least one color used in the at least one content object of a predetermined type; store information on the at least one color used in at least one rendered content object of the predetermined type; compare at least one characteristic of the rendered content in the raster canvas to at least one predetermined criteria; in response to a mismatch of the characteristic of the rendered content in the raster canvas with the at least one predetermined criteria, optimize the amount of colors used in the content of the raster canvas, wherein the optimization is performed by protecting the at least one color used in at least one rendered content object of the predetermined type; compress the content of the optimized content in the raster canvas; and output the compressed content of the raster canvas.

The system may be configured to compare the amount of colors in the raster canvas as at least one characteristic of the rendered content to a color limit set for the raster canvas.

The system may be configured to determine area information on each of content object during the analysis if the at least one received content object is a predetermined type. Furthermore, the system may be configured to perform a comparison of cumulative area information of a content object of a first type to at least one of the following: cumulative area information of at least one other content object of a second type, area information of a raster canvas. The system may be configured to define control data for color optimization in response to the comparison. Moreover, the system may be configured to utilize the control data in at least one of the following: selecting a file format for compressed content, selecting a color model for a file format, selecting a compression method for the content.

According to a third aspect, a computer-readable storage medium storing portions of computer program code is provided wherein the portions of computer program code are computer-executable to implement the method steps as disclosed in the context of the first aspect above.

The exemplary embodiments of the invention presented in this patent application are not to be interpreted to pose limitations to the applicability of the appended claims. The verb "to comprise" is used in this patent application as an open limitation that does not exclude the existence of also un-recited features.

The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION

Figure 1:
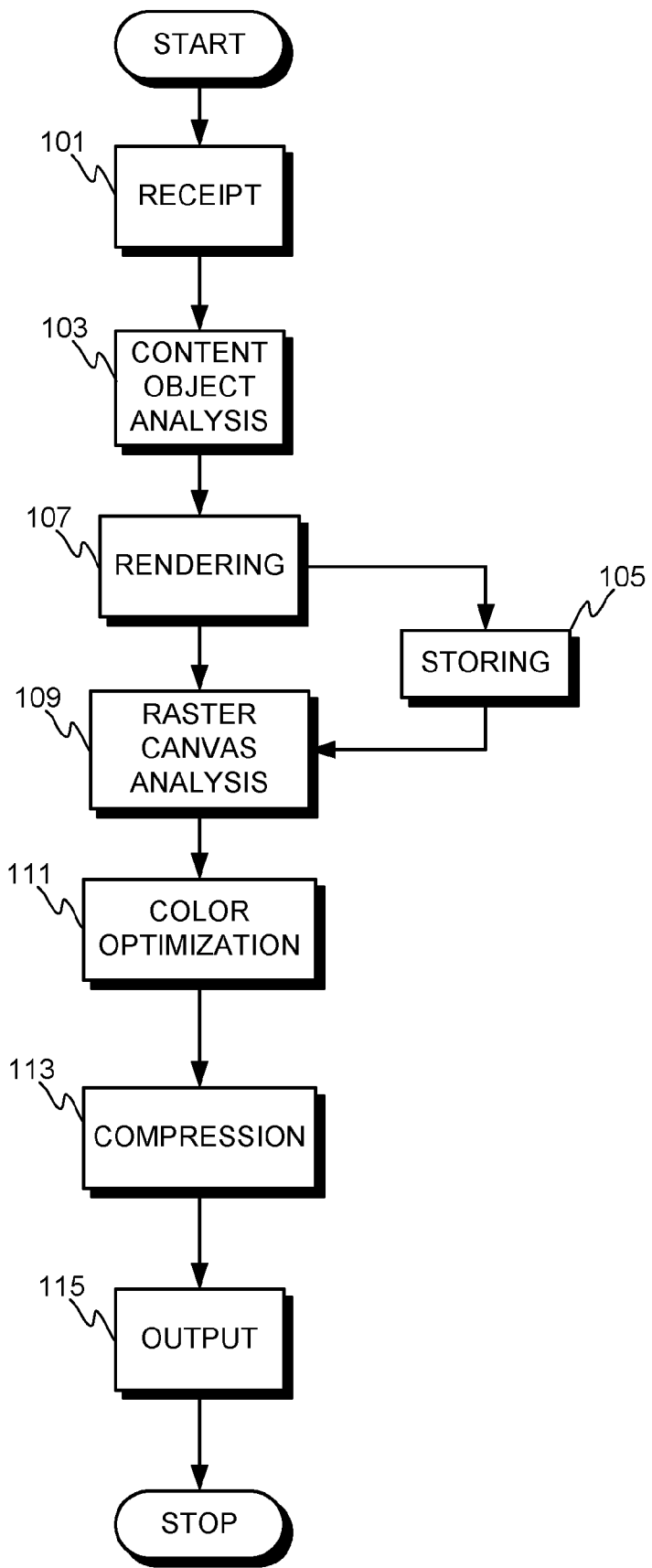
FIG. 1 illustrates an example of a method according to the invention.

Computer implemented method, system and computer program code are disclosed in order to selectively optimize colors in content comprising one or more separate content objects for visual representation. According to the invention characteristics of the content objects to be included in a raster canvas are determined and on the basis of the characteristics the color optimization is at least partly performed. For example, one characteristic to be taken into account in the color optimization is a type of the content objects.

According to an example of the invention at least some characteristics of the raster canvas into which one or more content objects are to be rendered are known. For example, at least the size of the raster canvas and a number of colors, which can be used in the content to be rendered in the raster canvas, are known. The size of the raster canvas may e.g. be defined in pixels.

In the following the example of the invention is described by referring to FIG. 1. One or more content objects are received 101 in a processing entity. The content objects may be embedded in one or more documents, which are received in the processing entity as a file or as a data stream. The content objects within the documents may e.g. be image, text, vector data content or similar, which are configured to be included in the final graphical presentation with necessary manipulation, if any, to the data. The receipt of content objects covers also any retrieval of the data from a predetermined location with computer implemented retrieval processes. The content objects may be within a document containing data, for example in a PDF, RTF, DOC/X or PPT/X format.

Characteristics of the one or more content objects are analyzed 103. At least a type of each of the received content objects is determined in the example of the invention. The determination of the type of the received content objects may be performed in the processing entity by comparing parameters of the received content objects, or the documents into which the content objects are embedded to, to predetermined criteria and based on the comparison the type of the content object is determined. The type of the content object may be text, image in a bitmap format or vector graphics, such as lineart, for example. According to the example of the invention the types of the received content objects are configured to be compared to predetermined types. The predetermined types of the content objects are defined in advance. If at least one received content object matches with any of the predetermined type, information relating to at least one color in a set of colors used in the at least one content object of the predetermined type is extracted from the content object. The information on the at least one color may comprise information on all the colors or a sub-set of the colors used in the at least one content object of the predetermined type. Typically, the predetermined content object types are such whose visual representation with an acceptable quality requires specific measures to be taken during the manipulation process as will be described later. For example, one received content object may be a text content and another received content object may e.g. be lineart. It is important to maintain the color information on both of these and, thus, the outcome of the content object analysis 103 may comprise information relating to colors from the sets of colors used in both of the mentioned content objects.

The delivery of information for rendering purposes relating to at least one color used in content objects of predetermined type may be performed by maintaining the information in a buffer memory in the processing entity, such as a processor. Alternatively or in addition, the information may be stored in a data file, e.g. a customized file comprising metadata information relating to content objects to be included in the same graphical presentation, such as a document page. In addition to the information on the at least one color used in the content objects of a predetermined type or types some additional information as regards the one or more content objects to be rendered in the raster canvas may be stored in the metadata, such as information the content types in general, e.g. if images or other kinds of drawings are existing, information on the raster canvas area, information on color of the raster canvas, information on the area needed for different content types in the raster canvas, such as cumulative area for bitmaps and text area in e.g. pixels. It shall be noted here that the additional information may comprise information on content objects of predetermined type, but also information on any content objects. In some case the additional information may comprise some statistical information determined in some manner from the content objects.

In some examples of the invention, some other information on the received content objects may be extracted in the analysis phase and stored. For example, information on the types of the content objects and coverage, i.e. area, of the objects in the raster canvas may be extracted and stored (not illustrated in FIG. 1).

According to the example of the invention the received content objects belonging to a page are rendered 107 in the raster canvas. If one or more received content objects are analyzed 103 to be a predetermined type of types, information on at least one color used in the one or more content objects of a predetermined type or types is determined and delivered as an input for rendering step 107. The rendering 107 comprises optimization of one or more content objects, i.e. the data of the content objects, according to one or more predetermined rules. Such rules may e.g. be selective color reduction, dithering, smoothing and so on. In practice, the optimization of colors with the rendering operation 107 may e.g. be arranged so that at least one color in content objects or objects of a predetermined type or types are maintained as they are, i.e. protected. Generally speaking an aspect of the invention is that colors to be protected may be selected so that they are the colors, which in content sense have importance in the final visual representation. In other words, the protected colors are typically such, which are relevant to the high fidelity visual representation of the important content details, such as text and related vector objects like tables and graphs. With respect to the content objects of other types than the predetermined type or types the number of colors are configured to be optimized, i.e. reduced, according to a predetermined reduction scheme defined in the control data for optimization. For example, the predetermined scheme may be defined so that if the content object is a first type, which is not of predetermined type, the color count after the rendering shall be at minimum X. For a second type of content object, which is not of predetermined type, the color count after the rendering shall be at minimum Y. And so on. In this manner the number of colors in the content objects, which are not of predetermined type, may be artificially limited, i.e. reduced from the original set of colors of a certain content object. Any other scheme for optimizing the number of colors in content objects, which are not of predetermined type, may be arranged. Also in some contexts it may be beneficial to optimize the number of colors of content objects of a predetermined type by the rendering operation 107. In such an arrangement it is, however, important to set limitations to the optimization so that the quality of e.g. textual objects, and other objects of predetermined types, are maintained on a sufficiently high level. Once the rendering is performed to all the content objects information on colors in one or more rendered content objects of predetermined types are stored 105. In other words, the outcome of the rendering as regards to colors in rendered content objects of predetermined type is stored 105.

In some implementations of the invention the information on colors, which is stored 105 for further use, may already be derived and stored in the step of content object analysis 103. This may be the case in the implementation in which it is arranged that the rendering does not affect colors in content objects of predetermined type or types.

Once all the content objects are rendered in the raster canvas as described above the whole content in the raster canvas is analyzed, step 109 in FIG. 1. The raster canvas analysis comprises determination of the content in the raster canvas as a whole. At least one characteristic of rendered content in the raster canvas is configured to be compared to at least one predetermined criteria, which may e.g. be set for the content in the raster canvas. In response to a mismatch in the comparison of the characteristic of the rendered content in the raster canvas with the at least one predetermined criteria, the amount of colors used in the content of the raster canvas is configured to be optimized. For defining the control data for the color optimization the piece of information stored 105 during the rendering phase 107 on the at least one color used in one or more content objects of predetermined type or types is at least partly configured to be used for example in the following way. The characteristic of the rendered content in the raster canvas may be used in the comparison may be the total number of colors used in the content of the raster canvas, which is determined from the rendered content. The total number of colors of the content in the raster canvas may be arranged to be compared to the color limit for the raster canvas when such a limit is set. If the comparison indicates mismatch of the amount of colors used in the content of the raster canvas, a control data is configured to be determined, which indicates that amount of colors used in the raster canvas shall be optimized, i.e. reduced, but the at least one protected color according to the stored piece of information shall be maintained, i.e. protected. In other words, the control data comprises instructions to maintain the at least one color received from the storage 105 in the color optimization 111 and instructions to reduce the total number of colors according to the color limit set for the raster canvas. The color limit refers here to maximum number of colors, which can be used in the raster canvas. In some special cases the content in the raster canvas may fulfill all requirements set for the raster canvas and there is no need for color optimization. In such a case the control data for color optimization indicates that nothing needs to be optimized.

The color optimization 111 is configured to be performed to the data of the raster canvas comprising the unified graphical data of the content objects. The color optimization is performed according to instructions defined in the control data received from the step of raster canvas analysis 109. As a result, the total color count used in the pixel data of the raster canvas is reduced and the color or colors used in the original content objects of a predetermined type are maintained and preserved. This enables maintaining the graphical information of the content objects of a predetermined type clear and sharp in the final graphical presentation.

Finally, a raster canvas comprising content in a color optimal form, fulfilling any limits defined for the raster canvas, is produced. The content of the raster canvas is compressed 113. In the compression step 113, the content of raster canvas is compressed with a compression method, which is preferably lossless compression method, such as PNG or TIFF. The advantage with the lossless compression method is that the data is preserved as it is. This enables maintaining the content originating from content objects of a predetermined type sharp and with good quality for visualization, which is a requirement for e.g. textual content. The use of lossless compression method is preferable, because with this measure one can avoid causing compression artifacts common to lossy compression methods.

The compressed raster image is finally stored in a file to a memory of the processing or any other entity or delivered as a data stream to another entity. The content of the file can then be visualized on a computer screen, printed out into a paper or delivered over a communication channel to an external entity.

Figure 2:
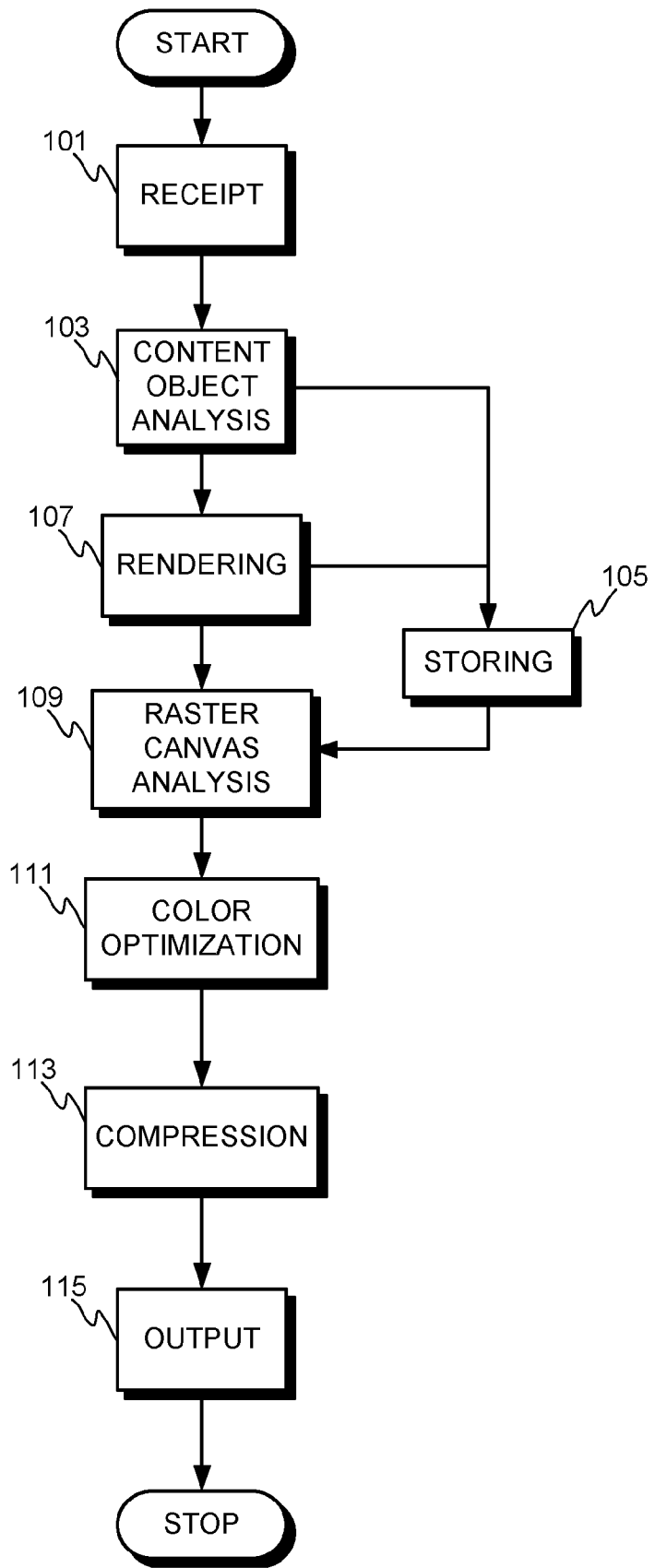
FIG. 2 illustrates another example of a method according to the invention.

In the description above it is disclosed an example of the invention in which the color optimization for the final visual representation is at least partly controlled with the information on the at least one color used in received content objects of predetermined type. In addition, some other information from content objects may be determined, which information may be used in definition of the control data for color optimization of the content in the raster canvas. Another example of the method according to the invention is illustrated in FIG. 2 in which some additional information is determined and used in the color optimization.

The content objects are received 101 and they are configured to be analyzed 103. In the content object analysis 103 the type of the content objects and information on at least one color used in content object or objects of predetermined type or types are determined as described in the content of FIG. 1. According to the example of the invention some other characteristics are configured to be determined from the received content objects in order to understand generic characteristics of the content in later stages of the method. The additional characteristics may comprise information on areas of each of the content object to be rendered in the raster canvas, which information on the additional characteristics is stored 105 for further use. According to the example of the invention the content object analysis 103 is performed individually to each of the received content objects and the information derived in the analysis is stored 105 individually for each received and analyzed content object. The content objects are rendered 107 in the raster canvas as described, and information on the protected at least one color used in one or more content objects of predetermined type or types are stored 105. The content of the raster canvas is analyzed 109 for optimization purposes. According to this example of the invention the raster canvas analysis 109 utilizes at least partly the information stored 105 in the rendering phase 107 and content object analysis phase 103. One aim of the raster canvas analysis 109 is to produce control data for color optimization step 111. As an input for color optimization step 111 at least information on the protected colors are delivered causing the color optimization not to affect to the protected colors in the raster canvas. In this manner the quality of the content originating from content objects of predetermined type or types can be maintained on a sufficient level. Furthermore, as the stored information comprises also additional information regarding the content objects rendered in the raster canvas, it may be used for deriving control data for color optimization 111. According to the example of the invention several parameters describing generic characteristics of the content, such a cumulative area of a specific type of content, in the raster canvas can be determined from the additional information. For example, a ratio of image area and vector area together against the total canvas area, a ratio of text area against the canvas area, a ratio of image area against the canvas area and/or vector drawing area against the canvas area may be determined from the additional information stored in the content object analysis phase 103. The area information of the raster canvas is known. For the determination of generic characteristics of the content the overlapping of the content objects in the raster canvas may also be taken into account in the raster canvas analysis. Instructions for handling content object data is defined for the rendering operation in order to determined which content from all the content objects will be the top-most. The overlapping of content objects also has such an effect that the colors in pixel or pixels, originating from a content object of a predetermined type, but which are not visible in the final output when all the content objects has been rendered into the canvas due to another content object overlapping the mentioned pixel, or pixels, need not to be protected nor stored, if no other content object of a predetermined type comprise the same color. The same may be applied when colors are blended causing replacement of certain colors with a color, or colors, in overlapping pixels comprising information originating from multiple content objects. When the understanding of the generic characteristics of the content in the raster canvas is created, the method according to the example of the invention may select an appropriate color optimization scheme for the content. It is possible to restrict the color model for the raster canvas in the color optimization when the content is some specific type, or more specifically when it complies with certain predetermined criteria. In other words, it is not useful to create a 24-bit bitmap images, if the content can be visualized with a color palette of 256 colors. This has effect when the content of the raster canvas is compressed and thus the computing resources, such as memory usage in the computing entity, can be saved. That is to say that it is possible to find the most optimal way to optimize colors in step 111, which does not belong to the protected colors originating from one or more content objects of predetermined type or types. The color optimization 111 is thus performed according to the control data received from the step of raster canvas analysis, as already described. Alternatively or in addition, the control data may comprise information based on which it is possible to select a file format for compressed content or a color model for a file format or to select a compression method for the content. For example, if the content in a bitmap comprises more colors than it is possible to include in a file format of a certain type, another applicable file format is arranged to be chosen. On the other hand, it may also be possible to select the most suitable color model for a file format based on colors used in bitmap content. Or, if e.g. the comparison of cumulative areas of content object types indicate that there is only one type of content, such as image content, in the raster canvas, an applicable compression method may be chosen, such as a lossy compression in order to produce the most optimal size and quality ratio. In some special cases the content in the raster canvas may fulfill all requirements set for the raster canvas and there is no need for color optimization. The outcome of the color optimization 111 is compressed 113 and outputted 115 as already discussed.

In some example of the invention it may e.g. be defined that if a graphic ratio i.e. the sum of image area and vector area against the canvas area is between 0.5 . . . 0.2, the color count in the palette for the raster canvas shall be reduced to 256, but forcing it to first include 7× text color count. Alternatively or in addition, it may be defined that if the image area is larger than vector area, the color palette is reduced to 256 colors and images are also dithered. On the other hand, if the image area is not larger than vector area, the color palette may only be reduced to 256 colors without dithering. It can be seen that the effects to be performed in response to the determination of different characteristics of the content, may vary and may optimally be selected according to content and desired outcome of the content manipulation.

Figure 3:
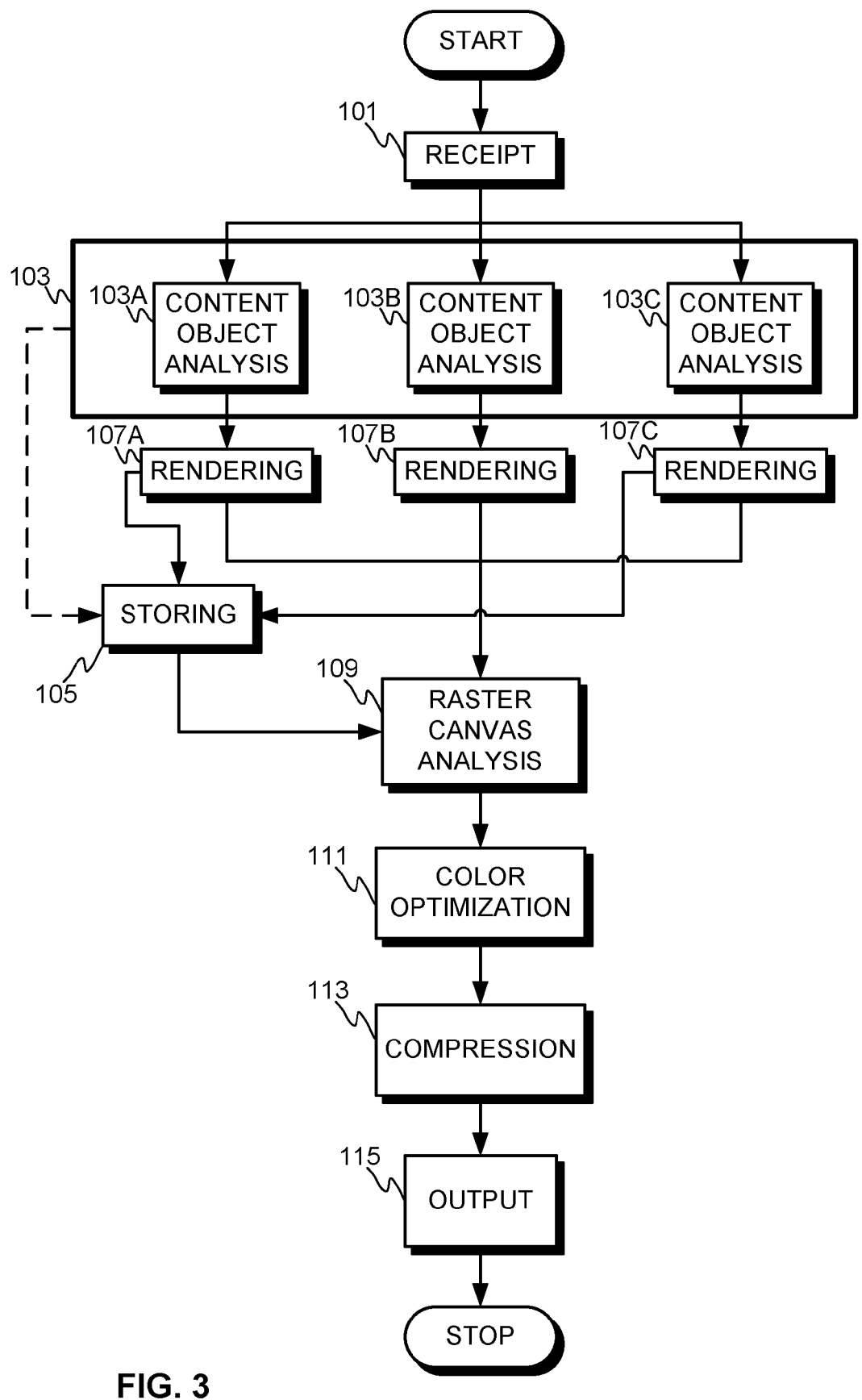
FIG. 3 illustrates a further example of the method according to the invention.

FIG. 3 shows in a more illustrative manner the analysis of content objects and the rendering of them. Here it is disclosed an exemplified situation in which three content objects are received 101 and each of them are analyzed 103A-103C either simultaneously or sequentially. The analysis comprises at least determining if the content object in question is a predetermined type or types and if yes, information on the color or colors used in the content objects of the predetermined type or types is taken as an input for rendering phase 107A-107C. Additionally, the analysis may comprise processes in which generic characteristics of the received content objects are determined and stored 105 (dashed arrow from box 103 to box 105). The rendering 107A-107C comprises optimization of one or more content objects, i.e. the data of the content objects, according to one or more predetermined rules, as discussed earlier. According to an example of the invention, at least color or colors of the content objects may be optimized. The color optimization during the rendering phase 107A-107C is arranged to be performed so that the at least one color used in at least one content object of a predetermined type, which are defined in step 103A-103C, are protected. The protection of the colors used in at least one content object of a predetermined type may mean that the colors are not optimized at all, or less optimization is performed to the defined colors than other colors. Once the rendering is performed to all the content objects information on colors in one or more rendered content objects of predetermined types are stored 105. In the example as illustrated in FIG. 3, content object of a predetermined type is determined in branch A (step 103A) and in branch C (step 103C). Thus, the information on the color or colors from rendering step 107A and 107C are stored 105. Next, the raster canvas analysis 109 is performed and at least the stored color information 105 is used when creating control data for the color optimization 111 as described earlier in the document. If information on the additional generic characteristics area stored 105, the information is accordingly utilized when creating the control information for color optimization 111. The color optimization 111 is performed according to the instructions defined in the control data and in such a manner the content data in the raster canvas can be color optimized so that the colors in the content originating from content object or objects of predetermined type or types can be maintained, and thus the quality of the content remains sufficient for visual representation. The compression 113 and the outputting 115 of the content may be arranged as already described.

Figure 4:
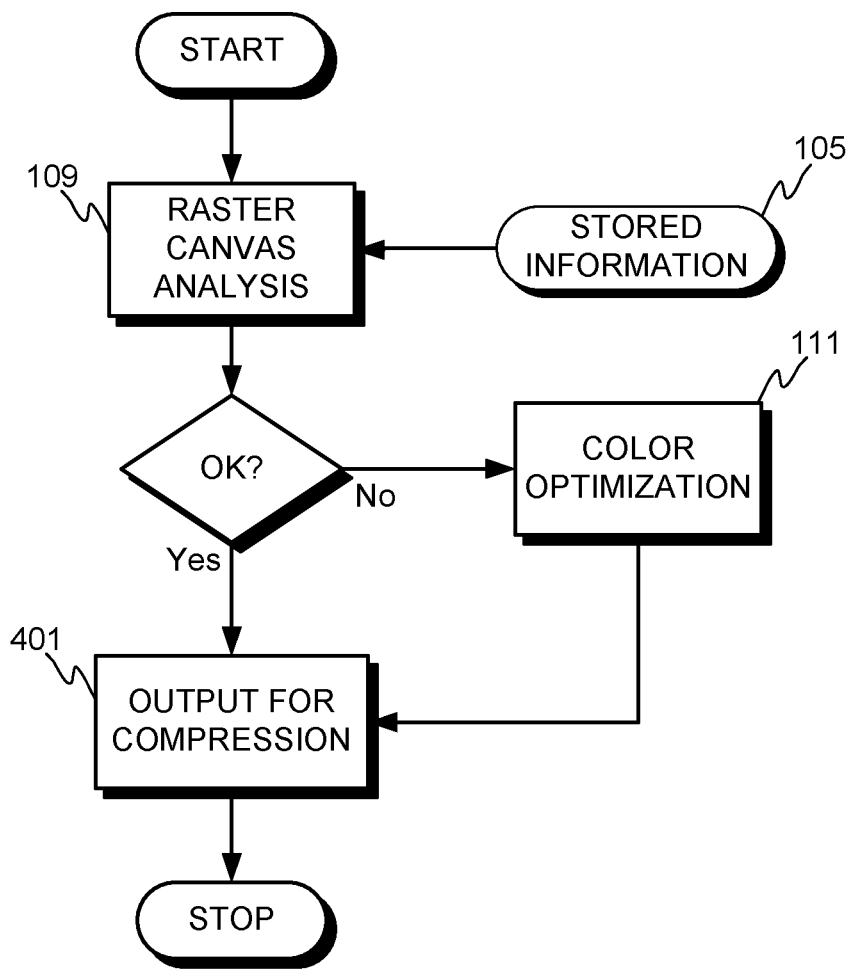
FIG. 4 illustrates an example of some method steps according to the invention.

In the following a more detailed description on the principle of raster canvas analysis and color optimization of the raster canvas is given by referring to FIG. 4. As described the raster canvas analysis 109 is configured to be performed when all content objects are rendered to the raster canvas. The raster canvas analysis 109 comprises one or more operations, as already described, by means of which the stored information on the content objects 105 can be utilized. The stored information comprises metadata from the received and analyzed content objects. Additionally, the raster canvas analysis may comprise operations in which the characteristics of the content raster canvas are compared to predetermined criteria set for the raster canvas, such as maximum amount of colors allowed to be used in the raster canvas. If the characteristics of the raster canvas comply with the predetermined criteria, there is no need to optimize the content in the raster canvas and the raster canvas data can be output for compression 401. On the other hand, if the characteristics of the raster canvas does not comply with one or more predetermined criteria set for the raster canvas, a color optimization 111 is performed to the content of the raster canvas according to instructions defined in a control data. Once the color optimization 111 is performed, the optimized content in the raster canvas may be output for compression 401.

Figure 5:
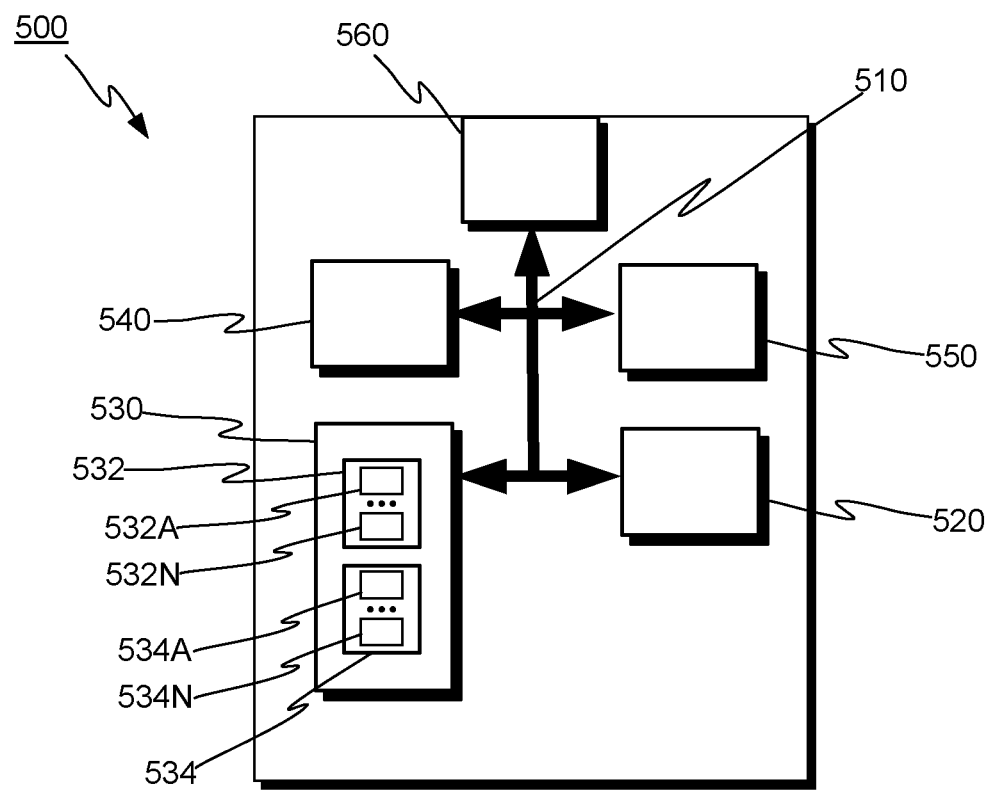
FIG. 5 illustrates an example of a system according to the invention.

The invention also relates to a system, which is configured to implement the method as described above. A system according to an example of the invention is illustrated in FIG. 5. The system 500 comprises, for example, a bus 510, a processor 520, a memory 530, input means 540, output means 550, and a communication interface 560. The bus 510 may include means or methods that enable communication among the elements of the system 500. The system may comprise, or be implemented by, one or more servers, one or more desktop computers, one or more laptop computers, one or more tablet computers, one or more mobile communication terminals or one or more special hardware devices as long as it is capable of implementing the method according to the invention. Thus, in principle any computing device, which comprises necessary hardware and computer program code stored in a memory, may be configured to implement the method as described.

The processor 520 may comprise one or more conventional processors, one or more microprocessors, or one or more processing logics, or any combination of these, that interprets and executes instructions defined by portions of computer program code.

The memory 530 may comprise a random access memory (RAM) 532 and/or a read only memory (ROM) 534. The RAM 532 may store information and instructions in a form of portions of computer program code 532A-532N for execution by the processor 520. The ROM 534 may include a conventional ROM device or another type of a static storage device that is configured to store static information and instructions in a form of portions of computer program code 534A-534N for use by the processor 520. The RAM 532 and ROM 534 may be implemented with one or more corresponding memory elements.

The input means 540 may comprise a conventional mechanism that permits inputting information to the system 500, such as a keyboard, a mouse, a pen, a touch screen, voice recognition and/or biometric mechanisms, CD/DVD/Blue-ray drive etc. The output means 550 may comprise a conventional mechanism that outputs information, including a display, a printer, a speaker, etc. The input and output means are not necessarily implemented into the system 500, but may be coupled to the system 500 with some known interface either wirelessly or in a wired manner when needed. In some examples of the invention the system does not comprise any input means 540 or output means 550 as the system operates as a standalone entity, which is controlled externally through the communication interface 560.

The communication interface 560 may enable the system 500 to communicate with other elements and/or systems, such as networks, as well as with client terminals either directly or indirectly over a network.

The system 500 may perform the operations as described above in response to the processor 520 executing at least one instruction defined in portions of computer program code contained in the computer-readable medium, such as memory. A computer-readable medium may be defined as a physical or logical memory device. The software instructions may be read into the memory from another computer-readable medium, such as a data storage device, or from another device via the communication interface 560. The software instructions may cause the processor 520 to perform method steps and processes as described and thus to enable the operation of the system 500 according to an example of the invention.

As said, FIG. 5 illustrates an example of the system 500 according to the invention. The elements as disclosed in FIG. 5 do not necessarily exist in all implementations of the system 500. For example, the system 500 may not comprise input means 540 and output means 550, but the system 500 may be accessed through the communication interface 560 with applicable devices and systems. As well, the number and type of memories may vary. Further, the amount of portions of computer program code may depend on the implementation.

The system 500 is configured, by means of at least part of the mentioned elements, to implement the method according to an example of the invention. The system 500 may be any device that receives the content data as an input through e.g. the communication interface 560, performs the described method steps and returns or forwards the processed image content data further.

An example of the invention also relates to a computer-readable storage medium, which stores at least portions of computer program code, wherein the portions of computer program code are computer-executable to implement the method steps in the system as described.

In the description herein it is disclosed that information on a set, or a sub-set from the set, of colors from content objects of predetermined type or types are configured to be protected, as described. In some cases it may not necessary be possible to protect all the colors due to limitation set for the raster canvas, for example. In such a case some additional mechanism may be set in order to protect the most important colors. For example, the method as described by comprise instruction that colors in a first type of content objects shall be protected prior to colors in a second type of content objects. Such a prioritization order for color protection may be set between all the content object, which may be received in the processing entity. For example, the prioritization order can be the following: textual content, vector graphics content, lineart content and image content, wherein the colors in the textual content are the most important to protect.

In the description it is used terms content object and content in the raster canvas, which are analyzed and manipulated as described. The used terminology shall be understood to mean that the data of the content object and the content data in the raster canvas are analyzed. Any similar expression shall also be understood in the same manner. For example, the information on the at least one protected color refers to the data, i.e. definitions, describing the color information.

The description here mainly discloses an environment in which the content object or objects of predetermined type is textual content. However, it shall be noted that it is a matter of decision, which content type is to be protected from the color count optimization. For example, line art may be one type of content, which shall be protected in order to maintain the sharpness of the lines in the content type. The inventive idea is not anyhow limited to any specific content type.

Some advantageous embodiments according to the invention were described above. The invention is not limited to the embodiments described. The inventive idea can be applied in numerous ways within the scope defined by the claims attached hereto.

What is claimed is:

1. A computer implemented method for optimizing an amount of colors used in content data, the method comprising:
 receiving at least one content object;
 determining whether the at least one received content object is a predetermined type; and
 in response to the determination that the at least one received content object is the predetermined type,
 determining at least one color used within the at least one content object of the predetermined type,
 rendering the at least one received content object to a raster canvas wherein the rendering is configured to be performed by protecting the at least one color used in the at least one content object of the predetermined type,
 storing information on the at least one color used in the at least one rendered content object of the predetermined type,
 comparing at least one characteristic of the at least one rendered content object in the raster canvas to at least one predetermined criteria,
 in response to a mismatch of the characteristic of the at least one rendered content object in the raster canvas with the at least one predetermined criteria, optimizing the amount of colors used in the content of the raster canvas, wherein the optimization is performed by protecting the at least one color used in the at least one rendered content object of the predetermined type,
 compressing the content of the optimized content in the raster canvas, and
 outputting the compressed content of the raster canvas.

2. The method as claimed in claim 1, wherein the at least one color comprises a set of colors used in all the received at least one content object of the predetermined type.

3. The method as claimed in claim 1, wherein the at least one color comprises a sub-set of a set of colors used in all the received at least one content object of the predetermined type.

4. The method as claimed in claim 1, wherein the amount of colors in the raster canvas is the at least one characteristic of the rendered content, which is compared to a color limit set for the raster canvas.

5. The method as claimed in claim 1, wherein the determination whether the at least one received content object is the predetermined type comprises determination of area information on each of the at least one content object.

6. The method as claimed in claim 5, further comprising comparison of a cumulative area information of the at least one content object of a first type to at least one of a cumulative area information of at least one other content object of a second type, and area information of the raster canvas.

7. The method as claimed in claim 6, further comprising defining control data for color optimization in response to the comparison of the area information.

8. The method as claimed in claim 7, wherein the control data is further utilized in at least one of the following: selecting a file format for compressed content, selecting a color model for the file format, selecting a compression method for the content.

9. A system for optimizing an amount of colors used in content data, the system comprising:
 one or more processors;
 a memory including computer program code;
 the memory and the computer program code configured to, with the processor, cause the system at least to perform;
 receive at least one content object,
 determine whether the at least one received content object is a predetermined type,
 in response to the determination that the at least one received content object is the predetermined type, determine at least one color used within the at least one content object of the predetermined type,
 render the at least one received content object to a raster canvas wherein the rendering is performed by protecting the at least one color used in the at least one content object of the predetermined type, store information on the at least one color used in at least one rendered content object of the predetermined type, compare at least one characteristic of the at least one rendered content object in the raster canvas to at least one predetermined criteria, in response to a mismatch of the characteristic of the at least one rendered content object in the raster canvas with the at least one predetermined criteria, optimize the amount of colors used in the content of the raster canvas, wherein the optimization is performed by protecting the at least one color used in at least one rendered content object of the predetermined type, compress the content of the optimized content in the raster canvas, and output the compressed content of the raster canvas.

10. The system as claimed in claim 9, wherein the system is configured to compare the amount of colors in the raster canvas, which is the at least one characteristic of the rendered content, to a color limit set for the raster canvas.

11. The system as claimed in claim 9, wherein the system is configured to determine area information on each of the at least one content object during the determination whether the at least one received content object is the predetermined type.

12. The system as claimed in claim 11, wherein the system is configured to perform a comparison of a cumulative area information of the at least one content object of a first type to at least one of a cumulative area information of at least one other content object of a second type, and area information of the raster canvas.

13. The system as claimed in claim 12, wherein the system is configured to define control data for color optimization in response to the comparison.

14. The system as claimed in claim 13, wherein the system is configured to utilize the control data in at least one of the following: selecting a file format for compressed content, selecting a color model for the file format, selecting a compression method for the content.

15. A non-transitory computer-readable storage medium storing portions of computer program code, wherein the portions of computer program code are computer-executable to implement the method comprising:

receiving at least one content object;

determining whether the at least one received content object is a predetermined type; and in response to the determination that the at least one of received content object is the predetermined type, determining at least one color used within the at least one content object of the predetermined type, rendering the at least one received content object to a raster canvas wherein the rendering is configured to be performed by protecting the at least one color used in the at least one content object of the predetermined type, storing information on the at least one color used in the at least one rendered content object of the predetermined type, comparing at least one characteristic of the at least one rendered content object in the raster canvas to at least one predetermined criteria, in response to a mismatch of the characteristic of the at least one rendered content object in the raster canvas with the at least one predetermined criteria, optimizing the amount of colors used in the content of the raster canvas, wherein the optimization is performed by protecting the at least one color used in the at least one rendered content object of the predetermined type, compressing the content of the optimized content in the raster canvas, and outputting the compressed content of the raster canvas.

* * * * *